April 22, 1924.
E. E. SLICK
VEHICLE WHEEL
Filed Dec. 6, 1919
1,491,560
3 Sheets—Sheet 1
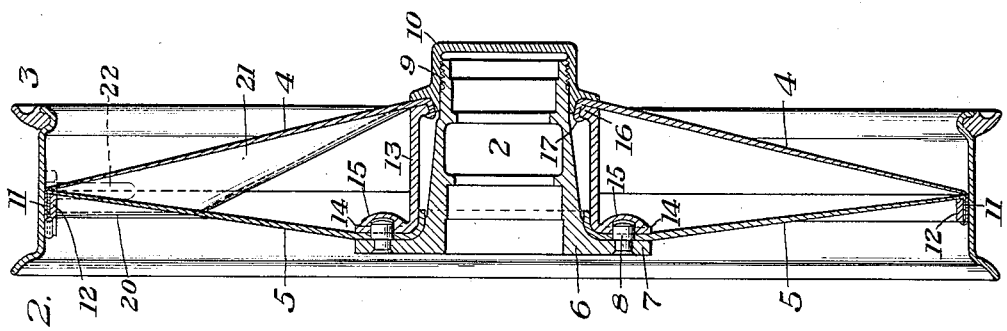
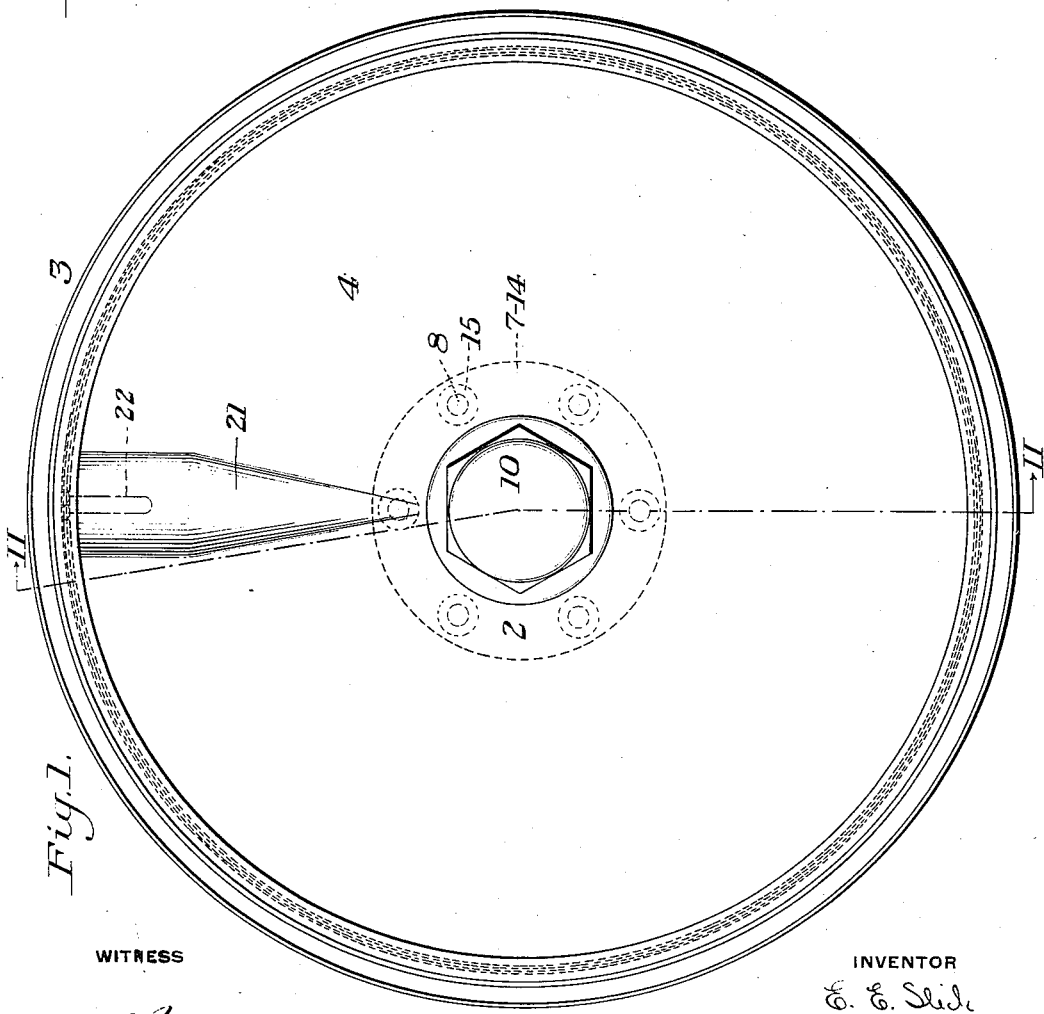
WITNESS
INVENTOR

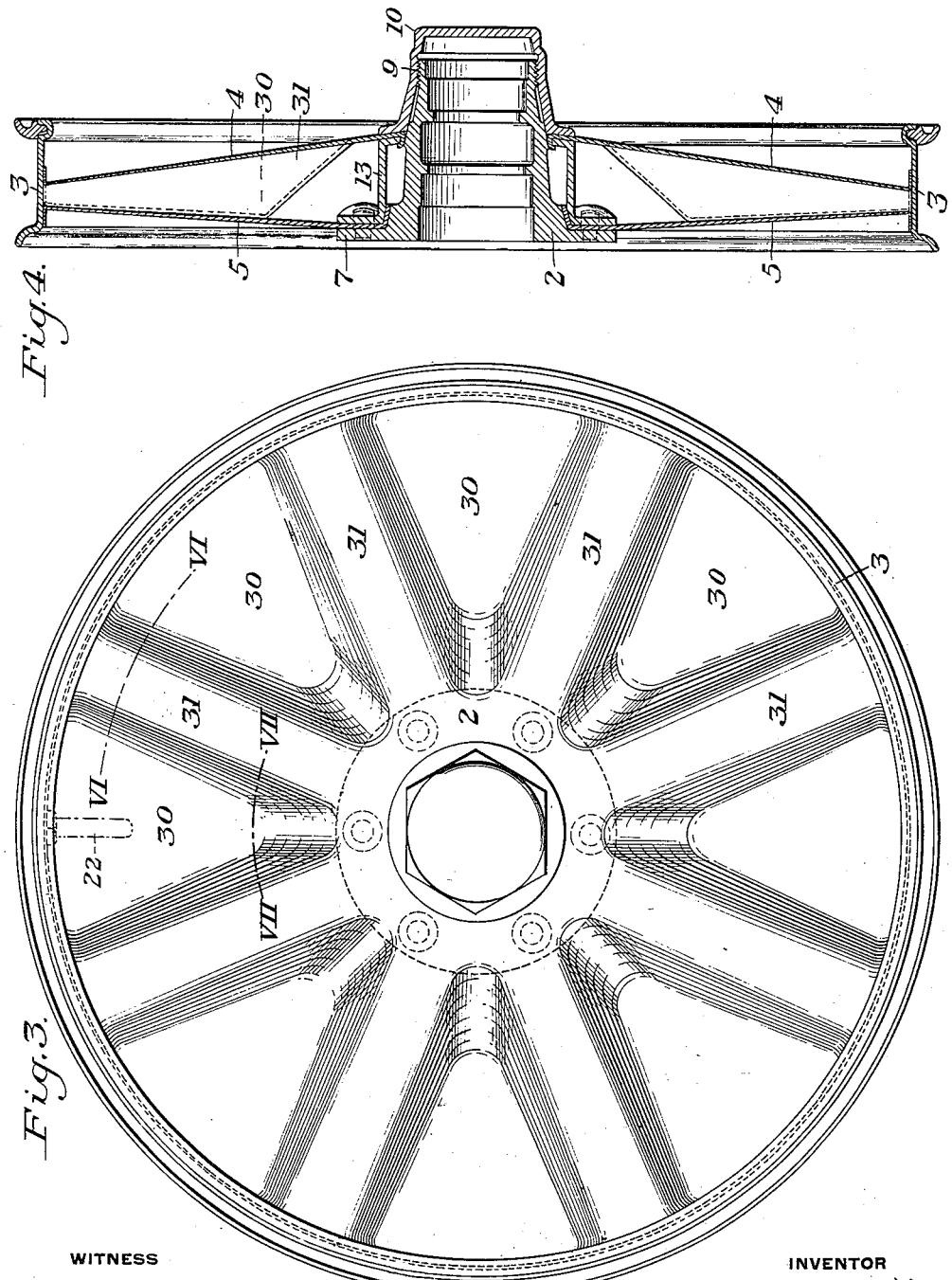

April 22, 1924.
E. E. SLICK
VEHICLE WHEEL
Filed Dec. 6, 1919
1,491,560
3 Sheets-Sheet 3
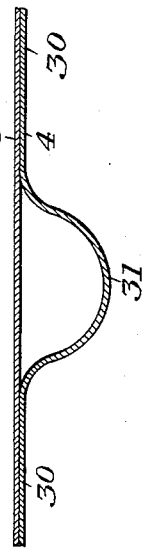
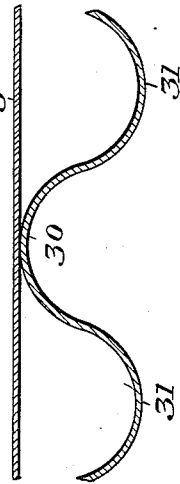
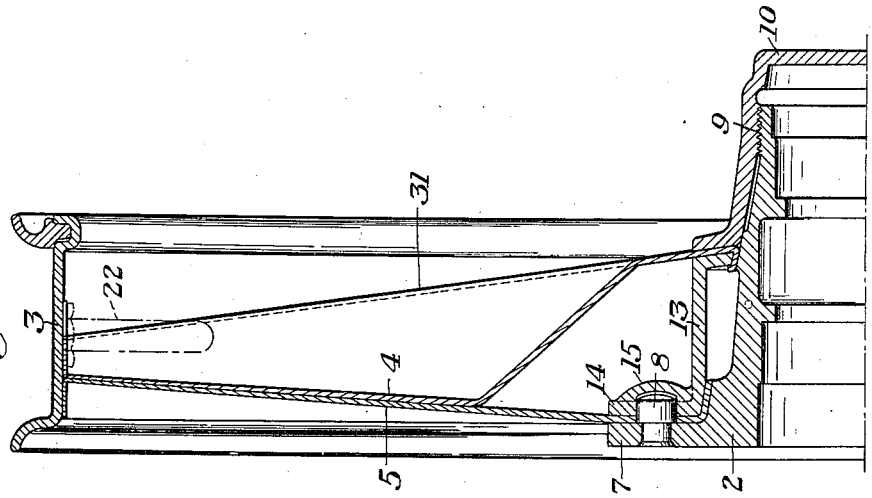
WITNESS
R H Balderson
INVENTOR
E. E. Slick
by Bakewell, Byrnes & Parmelee
his Attys.

Patented Apr. 22, 1924.

1,491,560

UNITED STATES PATENT OFFICE.

EDWIN E. SLICK, OF PITTSBURGH, PENNSYLVANIA.

VEHICLE WHEEL.

Application filed December 6, 1919. Serial No. 342,884.

*To all whom it may concern:*

Be it known that I, EDWIN E. SLICK, a citizen of the United States, residing at Pittsburgh, in the county of Allegheny and State of Pennsylvania, have invented a new and useful Improvement in Vehicle Wheels, of which the following is a full, clear, and exact description, reference being had to the accompanying drawings, forming part of this specification, in which—

Figure 1 is a side elevation of a vehicle wheel embodying the invention.

Figure 2 is a section along the line II—II of Figure 1.

Figures 3, 4, 5 and 6 illustrate a modification in which—

Figure 3 is a side elevation of the vehicle wheel.

Figure 4 is a central vertical section.

Figure 5 is an enlarged central vertical section.

Figure 6 is a detail section along the line VI—VI of Figure 3, and

Figure 7 is a detail section alng the line VII—VII of Figure 3.

The present invention relates to vehicle wheels and more particularly to a vehicle wheel in which two metallic webs or disks join the hub and rim in place of spokes.

The object of the invention is to produce a wheel of this character of a simple strong construction and one which is convenient for use particularly upon automobiles. With this object in view the present invention consists in the arrangement and combination of parts hereinafter described and more particularly pointed out in the claims, the advantages of which will be apparent to one skilled in the art from the following description.

Referring to the illustrated embodiment of the invention, the wheel comprises a hub member indicated generally by reference numeral 2, a rim member indicated generally by reference numeral 3, and two disks or webs 4 and 5 joining the hub and rim.

The hub 2 comprises a hub member proper 6 having a flange 7 which forms a shoulder or abutment to receive the inner edge of the disk 5. The flange 7 has studs 8 which project from it and pass through holes in the disk 5 for the purpose of preventing the disk 5 from rotation relative to the hub. The outer end of the hub member 6 is threaded at 9 to receive a hub cap or nut 10 which holds the demountable part of the wheel in place.

The disks 4 and 5 are of thicker gauge at the hub than they are at their periphery, being preferably tapered as indicated in the drawings. The disks are spaced apart at the hub but are brought together and joined at the rim, as shown particularly in Figure 2. At the rim, the edges of the disks 4 and 5 are bent over at right angles, as indicated by reference numeral 11, and are welded to each other and to the inside of the rim 3. A reinforcing ring 12 is preferably placed inside the bent over portions of the disks and is welded thereto, this making a stronger joint for supporting the rim on the disks. As shown in Figure 2 the two disks outwardly converge forming the two legs of a V looking at the wheel in cross section as shown in Figure 2. The inner edges of the disks 4 and 5 are united to a spacer sleeve 13. This spacer sleeve 13 has a flange 14 which fits against and is welded to the disk 5. This flange 14 has bosses 15 which fit over the head of the studs 8. The outer end (that is the end away from the vehicle) of the spacer 13, has an inwardly projecting flange 16 over which the inner edge of the disk 4 is peened or bent at 17. The disk 4 may be welded to the spacer 13 at this point.

The rim, the two disks 4 and 5, and the spacer 13 make up the demountable part of the wheel. This demountable part may be taken from the hub by unscrewing the hub cap 10 and another demountable part put in its place. The hub cap 10, as shown in Figure 2, is a short cap bearing against the edge of the disk 4 at the spacer 13 and pressing the disk 5 into firm engagement with the shoulder on the flange 16 at the inner end of the hub member 6.

As shown in Figure 2 the disks 4 and 5 join the rim 3 at its central portion. When a pneumatic tire is employed the valve or filling tube projects through a valve hole at the middle of the rim 3. The disks 4 and 5 are deflected inwardly (that is toward the vehicle side of the wheel) at the valve hole of the rim. As shown in the drawings, the inner disk 5 has a small bend or deflected area 20 at its periphery while the outer disk 4 has a considerably larger deflected area 21, this area extending nearly to the center of the disk. It would be obvious, however, that the extent of such deflected area might be varied. As indicated in Figure 2 the deflected portions of the disks are brought together and their edges and the reinforcing ring 12 bent around to the inside of the valve which is indicated in dotted lines at 22. This gives access to the valve at the outside of the wheel, that is to say the side of the wheel away from the vehicle. This construction also does away with the doors heretofore employed in double disk wheels where the valve stem projects between the disks.

In Figures 3 to 7, inclusive, is illustrated another embodiment of the invention in which one of the disks is corrugated so as to form a spoke-like structure. This wheel has the hub 2 and rim 3 joined by two tapered disks 4 and 5. The disk 4, instead of being of a substantially plain shape, as shown in Figures 1 and 2, is corrugated, depressions 30 being pressed into the disk 4. These depressions 30 lie against the inside of the other disk 5. This produces spokes 31 where the disks 4 and 5 are spaced apart. The disks 4 and 5 may or may not be welded together at the depressions 30.

The depressions 30 and spokes 31 are symmetrically disposed giving an attractive appearance to the wheel. The hole for the valve stem 22 of a pneumatic tire comes opposite one of the depressions 30. In this construction the space for the valve stem is provided without marring the symmetry of the wheel. The spoke-like construction is not only attractive to the eye, but possesses great strength and rigidity.

As shown in Figures 4 and 5, the outer edges of the disks 4 and 5 are bent at right angles oppositely to each other and are united with a rim, preferably by welding.

While I have specifically illustrated and described the preferred embodiment of my invention, it is understood that the invention is not to be limited to its illustrated embodiment but may be embodied in other constructions of vehicle wheels within the scope of the following claims.

I claim:

1. A vehicle wheel comprising a hub, a rim, two outwardly converging disks joining the hub and rim, one of said disks being uncorrugated and the other of said disks being corrugated to form spokes separated by substantially flat triangular areas fitting against the uncorrugated disk, substantially as described.

2. A vehicle wheel comprising a hub, a rim, and two outwardly converging disks joining the hub and rim, at least one of said disks being corrugated and having substantially flat areas fitting against the uncorrugated disk, substantially as described.

3. A vehicle wheel comprising a hub, a rim, an inner disk joining the hub and rim, and an outer disk joining the hub and rim, said outer disk having radial depressions therein forming spoke-like portions of uniform width in said outer disk intermediate said depressions, substantially as described.

4. A vehicle wheel comprising a hub, a rim, an inner disk joining the hub and rim, and an outer disk joining the hub and rim and radially corrugated throughout a portion only of the radial distance between the hub and rim to form spoke-like portions in said outer disk, the bottom portions of said corrugations being secured to the inner disk, substantially as described.

5. A vehicle wheel comprising a hub, a rim, an inner disk joining the hub and rim, and an outer disk cooperating therewith and having spoke-like corrugations, the bottom portions of which are secured to the inner disk, substantially as described.

6. A vehicle wheel comprising a hub, a rim, an inner disk joining the hub and rim, and an outer disk joining the hub and rim, said outer disk having radial depressions therein lying in contact with the inner disk and forming spoke-like portions of uniform width in said outer disk intermediate said depressions, substantially as described.

7. A vehicle wheel comprising a hub, a rim, an inner disk joining the hub and rim, and an outer disk joining the hub and rim, and having radial spoke-like corrugations therein, the bottom portions of which form flat areas which lie in contact with and are secured to the inner disk, substantially as described.

In testimony whereof I have hereunto set my hand.

EDWIN E. SLICK.